US012775684B2

(12) United States Patent
Stahl et al.

(10) Patent No.: US 12,775,684 B2
(45) Date of Patent: Oct. 27, 2026

(54) ARTIFICIAL INTELLIGENCE TRACEABILITY AND CONTROL SYSTEM

(71) Applicant: Stahl Industries LLC, Dallas, TX (US)

(72) Inventors: Andrew Kenneth Stahl, Dallas, TX (US); José Alberto Márquez Benítez, Mexico City (MX); David Aaron Kennedy, Plano, TX (US); Jered Remington Sutton, Waxahachie, TX (US); Evan Alexander Bauer, Lamy, NM (US); Jared Anthony Trog, Waxahachie, TX (US); Steven Michael Charo, II, Waxahachie, TX (US)

(73) Assignee: Stahl Industries LLC, Dallas, TX (US)

( * ) Notice: Subject to any disclaimer, the term of this patent is extended or adjusted under 35 U.S.C. 154(b) by 0 days.

(21) Appl. No.: 19/574,619

(22) Filed: Mar. 23, 2026

(65) Prior Publication Data

US 2026/0288916 A1 Sep. 24, 2026

Related U.S. Application Data

(63) Continuation-in-part of application No. 19/087,962, filed on Mar. 24, 2025.

(51) Int. Cl.
*G06F 21/16* (2013.01)
*G06F 21/53* (2013.01)
*G06F 21/60* (2013.01)

(52) U.S. Cl.
CPC .............. *G06F 21/16* (2013.01); *G06F 21/53* (2013.01); *G06F 21/602* (2013.01)

(58) Field of Classification Search
CPC ......... G06F 21/16; G06F 21/53; G06F 21/602
See application file for complete search history.

(56) References Cited

U.S. PATENT DOCUMENTS 11,507,662 B2 * 11/2022 Addepalli .............. G06N 3/084
11,514,365 B2 ‡ 11/2022 Cheruvu et al.
(Continued)

FOREIGN PATENT DOCUMENTS

CN 112132290 A 12/2020
CN 119358046 A 1/2025
(Continued)

OTHER PUBLICATIONS

"U.S. Appl. No. 19/087,962, Non Final Office Action mailed Jun. 25, 2026", 19 pgs.
(Continued)

*Primary Examiner* — Sher A Khan
(74) *Attorney, Agent, or Firm* — Schwegman Lundberg & Woessner, P.A.

(57) ABSTRACT

An artificial intelligence (AI) traceability system for real-time monitoring of a group of AI agents generates a lineage tag for new data created by downstream applications using AI-generated data. The system generates a baseline, for each AI agent of the plurality of AI agents, comprising one or more metric derived from AI-generated data generated from the execution of each AI agent, and continuously evaluates AI-generated data output from each AI agent as each AI agent is executed, to detect an output exceeding a threshold for a given metric. The system uses a lineage tag for the AI-generated data to trace actions that led to the AI-generated data output, based on detecting AI-generated data output exceeding a threshold for a given metric, to execute a predefined action.

20 Claims, 8 Drawing Sheets

(56) References Cited

U.S. PATENT DOCUMENTS

| | | | | |
|---|---|---|---|---|
| 12,198,030 | B1 * | 1/2025 | Mysore | G06F 11/3684 |
| 12,321,831 | B1 * | 6/2025 | Karpman | G06N 20/00 |
| 12,361,220 | B1 * | 7/2025 | Krull | G06F 40/295 |
| 12,406,084 | B1 * | 9/2025 | Krull | G06F 9/547 |
| 12,524,405 | B1 | 1/2026 | Martini et al. | |
| 12,531,789 | B2 * | 1/2026 | Gajic | H04L 41/16 |
| 12,699,552 | B2 | 8/2026 | Hicks et al. | |
| 2017/0278212 | A1 | 9/2017 | Fry | |
| 2018/0181730 | A1 | 6/2018 | Lyske | |
| 2021/0334700 | A1 | 10/2021 | Nagaraja | |
| 2021/0390447 | A1 | 12/2021 | Cheruvu et al. | |
| 2022/0166782 | A1 | 5/2022 | Zoldi et al. | |
| 2023/0283629 | A1 * | 9/2023 | Boyer | H04L 63/1416 726/22 |
| 2024/0073219 | A1 * | 2/2024 | Maizels | G06V 40/174 |
| 2024/0104158 | A1 | 3/2024 | Chigurupalli et al. | |
| 2024/0345914 | A1 | 10/2024 | Selvaraj et al. | |
| 2024/0403445 | A1 * | 12/2024 | Straub | G06F 11/3457 |
| 2024/0419493 | A1 | 12/2024 | Ramanujan et al. | |
| 2025/0048085 | A1 | 2/2025 | Wang et al. | |
| 2025/0068893 | A1 | 2/2025 | Bradea et al. | |
| 2025/0165296 | A1 * | 5/2025 | Hwang | G06F 9/5027 |
| 2025/0184366 | A1 | 6/2025 | Keiser, Jr. | |
| 2025/0256864 | A1 * | 8/2025 | Catledge | G06Q 10/06312 |
| 2025/0363421 | A1 | 11/2025 | Turley et al. | |
| 2026/0017386 | A1 * | 1/2026 | Ohayon | G06F 21/577 |
| 2026/0037617 | A1 | 2/2026 | Melin et al. | |
| 2026/0044615 | A1 | 2/2026 | O'leary et al. | |

FOREIGN PATENT DOCUMENTS

| | | | | | |
|---|---|---|---|---|---|
| JP | 2025111385 | A | * | 7/2025 | G06F 16/9024 |
| WO | WO-2024112501 | A1 | | 5/2024 | |
| WO | WO-2025080584 | A1 | * | 4/2025 | G06Q 10/0633 |
| WO | WO-2025179019 | A1 | | 8/2025 | |
| WO | WO-2026015679 | A1 | * | 1/2026 | G06F 40/20 |

OTHER PUBLICATIONS

"U.S. Appl. No. 19/087,962, Response filed Jul. 9, 2026 to Non Final Office Action mailed Jun. 25, 2026", 11 pgs.

"U.S. Appl. No. 19/701,920, Notice of Allowance mailed Aug. 14, 2026", 13 pgs.

* cited by examiner
‡ imported from a related application

ARTIFICIAL INTELLIGENCE TRACEABILITY AND CONTROL SYSTEM

PRIORITY

This application is a continuation-in-part of U.S. patent application Ser. No. 19/087,962, filed Mar. 24, 2025, which is incorporated by reference herein in its entirety.

BACKGROUND

The integration of artificial intelligence (AI), such as generative AI (GenAI), into business applications has revolutionized data-driven decision-making, content creation, and operational efficiency. GenAI technologies are increasingly used to generate insights, automate processes, and drive innovation across industries. Despite the transformative benefits, the adoption of GenAI introduces a critical challenge: the lack of comprehensive traceability mechanisms for the data and processes influenced by AI. Without traceability, organizations face risks associated with data integrity, regulatory non-compliance, opaque decision-making, and the inability to detect and address biases in AI-influenced outcomes.

BRIEF DESCRIPTION OF THE DRAWINGS

The drawings provided are for illustrative purposes and do not restrict the scope of this disclosure.

DETAILED DESCRIPTION

Figure 1:
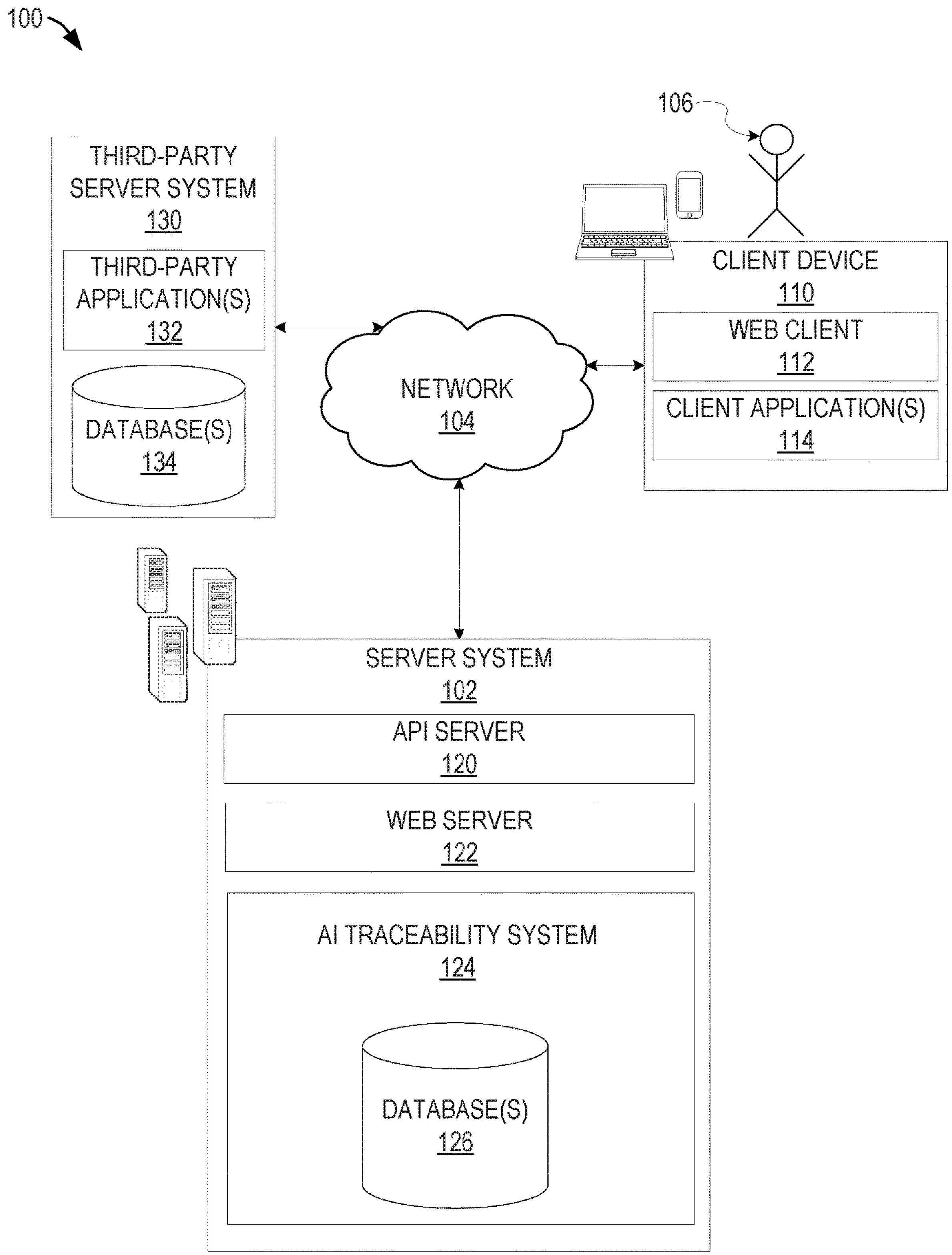
FIG. 1 is a block diagram illustrating a networked system, consistent with some examples.

As organizations increasingly adopt generative AI systems, a critical technical problem is the inability to trace and verify how AI-generated content influences downstream business processes and decision-making. Traceability in AI refers to the ability to monitor, document, and verify every aspect of the lifecycle of AI-generated content and process flows, including the algorithmic models, the configurations, the knowledge base, the inputs, the outputs as well as the downstream impacts. This feature is essential to ensure accountability, reproducibility, and transparency in AI-powered systems. Specifically, when AI-generated outputs are used across multiple systems and processes, organizations lack the technical controls to track the origin, verify compliance, and detect potential issues like bias or incorrect data sources.

An AI traceability system is described herein that addresses these technical problems by implementing a multi-level traceability framework that creates unique identifiers and watermarks to track direct AI outputs and their downstream influence. For example, in financial systems using AI for analytics, the framework enables organizations to trace where answers originated and verify if correct data sources were used. The system captures critical metadata about the AI agent's configuration, such as model parameters, knowledge base versions, and prompts, and then propagates this information through watermarks as the data flows through different applications and processes.

In some examples, the AI traceability system utilizes a dual-hash integrity model to bifurcate governance into task-specific rules, which are encoded within an AI agent's unique identifier, and organizational rules, and which are maintained in an immutable treaty repository. This dual-layer approach enables the AI traceability system to move from passive observability to real-time, deterministic intervention.

Further, application programming interfaces (APIs) and orchestration capabilities enable integrated tracking and verification across enterprise systems. By embedding watermarks and maintaining detailed downstream records, organizations can implement technical controls to detect bias, validate decision-making processes, and ensure compliance requirements are met. This addresses the fundamental technical challenge of maintaining traceability when AI-generated content is modified, augmented, or used as input for subsequent processes and decisions.

For example, the AI traceability system generates a unique agent identifier for each artificial intelligent (AI) agent of a plurality of AI agents utilized in a given networked system. The AI traceability system detects each execution of a plurality of executions of each of the plurality of AI agents utilized in the given networked system. For each detected execution, the AI traceability system generates a data unique tag comprising the unique agent identifier associated with an AI agent that was executed, a time stamp associated with execution, and contextual metadata and assigns the data unique tag to AI-generated data generated from the execution of the AI agent. The AI traceability system detects accessed data by a downstream application, the accessed data comprising AI-generated data generated from execution of one or more AI agents of the plurality of AI agents and generates a watermark for new data created by the downstream application, the watermark based on each data unique tag associated with the accessed data. The AI traceability system can store the watermark with the new data to enable tracing of AI influence across the given networked systems.

In some examples, the unique agent identifier is generated as a cryptographically secure SHA-256 hash derived from a comprehensive AI agent configuration profile. This profile includes the model version, system prompt, knowledge base certificates, and specific sampling parameters, such as temperature, Top_P (nucleus sampling), and Top_K (filtering by count). By incorporating these parameters into the hash, the AI traceability system ensures that any unauthorized modification to an AI agent's behavioral 'personality' or logic results in a novel unique agent identifier, triggering immediate detection of potential logic poisoning.

The AI traceability system further comprises a control system as an operational layer that determines baseline metrics for a given agent, detects issues and anomalies based on deviations from the baseline metrics, and utilizes the watermarks or lineage tags to determine actions to address the issues and anomalies. For instance, the AI traceability system generates a baseline for a composite workflow executed by one or more AI agents identified by a unique agent identifier in an AI data registry (also referred to herein as an agent activity ledger). The baseline comprises one or more metrics derived from a sequenced set of lineage tags. Each lineage tag serves as a process wrapper for an individual execution of the composite workflow. The AI traceability system continuously evaluates the operational integrity of the workflow by monitoring the cumulative output and behavioral patterns associated with the lineage tags generated during execution to detect a deviation exceeding a threshold for a given workflow metric. Based on detecting a deviation associated with a specific lineage tag, the AI traceability system performs a recursive traceback to identify the constituent data unique tags and contributing unique agent identifiers that led to the threshold breach. The AI traceability system then selects one or more predefined actions and executes a script associated with the predefined action to maintain the steady state of the business process. Some examples of a predefined action include quarantining a specific AI agent within the workflow to prevent further execution, initiating a failover workflow to a secondary configuration, triggering a refinement workflow based on the traced actions, and the like.

In some examples, the control system operates as a deep proxy. In this configuration, the AI traceability system is positioned in-band within the inference path between an orchestrator and an inference provider. Upon detecting a proposed action that violates an enforcement object generated at runtime, the system executes an in-flight interrupt, effectively blocking the communication with the provider and initiating an instantaneous quarantine of the subject AI agent, identifiable by a unique agent identifier.

For example, the AI traceability system generates a baseline, for each AI agent of the plurality of AI agents identified by a unique agent identifier in an AI data registry, comprising one or more metric derived from AI-generated data generated from the execution of each AI agent. The AI traceability system continuously evaluates AI-generated data output from each AI agent as each AI agent is executed, to detect an output exceeding a threshold for a given metric. Based on detecting AI-generated data output exceeding a threshold for a given metric, the AI traceability system uses a lineage tag for the AI-generated data to trace actions that led to the AI-generated data output. The AI traceability system selects a predefined action comprising at least one of quarantining the AI agent to prevent further execution or initiating a workflow to use the actions traced from the data unique tag and executes a script associated with the predefined action.

FIG. 1 is a block diagram illustrating a networked system 100, according to some example embodiments. The system 100 can include one or more client devices such as client device 110. The client device 110 can comprise, but is not limited to, a mobile phone, desktop computer, laptop, portable digital assistant (PDA), smart phone, tablet, Ultrabook, netbook, laptop, multi-processor system, microprocessor-based or programmable consumer electronic, game console, set-top box, computer in a vehicle, wearable computing device, or any other computing or communication device that a user may utilize to access the networked system 100.

In some embodiments, the client device 110 comprises a display module (not shown) to display information (e.g., in the form of user interfaces). In further embodiments, the client device 110 can comprise one or more of touch screens, accelerometers, gyroscopes, cameras, microphones, global positioning system (GPS) devices, and so forth. The client device 110 can be a device of a user 106 that is used to access and utilize an AI traceability system 124 for queries, reporting and other applications.

One or more users 106 may be a person, a machine, or other means of interacting with the client device 110. In example embodiments, the user 106 may not be part of the system 100 but can interact with the system 100 via the client device 110 or other means. For instance, the user 106 can provide input (e.g., touch screen input or alphanumeric input) to the client device 110 and the input can be communicated to other entities in the system 100 (e.g., third-party server system 130, server system 102) via a network 104. In this instance, the other entities in the system 100, in response to receiving the input from the user 106, communicate information to the client device 110 via the network 104 to be presented to the user 106. In this way, the user 106 can interact with the various entities in the system 100 using the client device 110.

The system 100 further includes a network 104. One or more portions of network 104 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 can access the various data and applications provided by other entities in the system 100 via web client 112 (e.g., a browser, such as the Internet Explorer® browser developed by Microsoft® Corporation of Redmond, Washington State) or one or more client applications 114. The client device 110 can include one or more client applications 114 (also referred to as "apps") such as, but not limited to, a web browser, a search engine, a messaging application, an electronic mail (email) application, an e-commerce site application, a mapping or location application, an enterprise resource planning application, a customer relationship management application, an application for accessing and utilizing the AI traceability system 124, and the like.

In some embodiments, one or more client applications 114 are included in a given client device 110, and configured t7o locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access the AI traceability system 124, and so forth), and so forth. Conversely, one or more client applications 114 may not be included in the client device 110, and then the client device 110 can use its web browser to access the one or more applications hosted on other entities in the system 100 (e.g., third-party server system 130, server system 102).

A server system 102 provides server-side functionality via the network 104 (e.g., the Internet or wide area network (WAN)) to one or more third-party server system 130 and/or one or more client devices 110. The server system 102 can include an application program interface (API) server 120, a web server 122, and an AI traceability system 124 that can be communicatively coupled with one or more databases 126.

The one or more databases 126 comprise storage devices that store data related to users of the system 100, applications associated with the system 100, cloud services, machine learning models, data related to entities/products/services, and so forth. The one or more databases 126 can further store information related to third-party server system 130, third-party applications 132, third-party database(s) 134, client devices 110, client applications 114, users 106, and so forth. In one example, the one or more databases 126 is cloud-based storage. In some examples, the one or more databases 126 stores data related to data utilized by the AI traceability system 124, as explained in further detail below.

In some examples, the one or more databases 126 further comprise an immutable treaty repository. This repository stores sovereign organizational rules and global regulatory constraints (e.g., EU AI Act, NIST RMF). These rules are categorized as AI agent-level, organizational-level, or regulatory-level and are dynamically retrieved by a rule merge engine to establish deterministic boundaries for agentic behavior.

The server system 102 can be a cloud computing environment, according to some example embodiments. The server system 102, and any servers associated with the server system 102, can be associated with a cloud-based application, in one example embodiment.

The AI traceability system 124 provides back-end support for third-party applications 132 and client applications 114, which can include cloud-based applications. The AI traceability system 124 provides mechanisms for enabling traceability in AI-influenced data and processes across business applications. The AI traceability system 124 can comprise one or more servers or other computing devices or systems.

As mentioned above, the AI traceability system 124 provides a multi-level traceability framework to monitor, document, and verify AI agents, AI-generated data, and AI-influenced data. In some examples, the AI agents are GenAI-powered agents, the AI-generated data is GenAI-generated data, and AI-influenced data is GenAI-influenced data. By implementing structured traceability mechanisms, the AI traceability system 124 ensures seamless identification, attribution, and lineage tracking of AI-influenced outcomes. As described further below, the AI traceability system 124 uses unique tagging to ensure seamless identification and attribution across all traceability levels.

As indicated above, one example of AI is generative AI (GenAI). Generative AI is a term that can refer to artificial intelligence technology that can create new content based on learned patterns from large training datasets when prompted by systems or users. Input data for a generative AI agent can include text, audio, image, video, numeric, or prompts, and the output data can include text, images, video, audio, code, or synthetic data. Some examples of GenAI include large language models (LLMs) such as Llama, Mistral GPT, Claude, Gemini, PaLM, Command R, Luminous, and the like.

The system 100 further includes one or more third-party server system 130. The one or more third-party server system 130 can include one or more third-party application (s). The one or more third-party application(s) 132, executing on third-party server(s) 130, can interact with the server system 102 via API server 120 via a programmatic interface provided by the API server 120. For example, one or more of the third-party applications 132 can request and utilize information from the server system 102 via the API server 120 to support one or more features or functions on a website hosted by the third party or an application hosted by the third party.

The third-party website or application 132, for example, can provide access to functionality and data supported by third-party server system 130. In one example embodiment, the third-party website or application 132 provides access to functionality that is supported by relevant functionality and data in the third-party server system 130. In another example, a third-party server system 130 is a system associated with an entity that accesses cloud services via server system 102.

The third-party database(s) 134 can be storage devices that store data related to users of the third-party server system 130, applications associated with the third-party server system 130, cloud services, machine learning models, parameters, and so forth. The one or more databases 126 can further store information related to third-party applications 132, client devices 110, client applications 114, users 106, and so forth. In one example, the one or more databases 134 are cloud-based storage.

Figure 2:
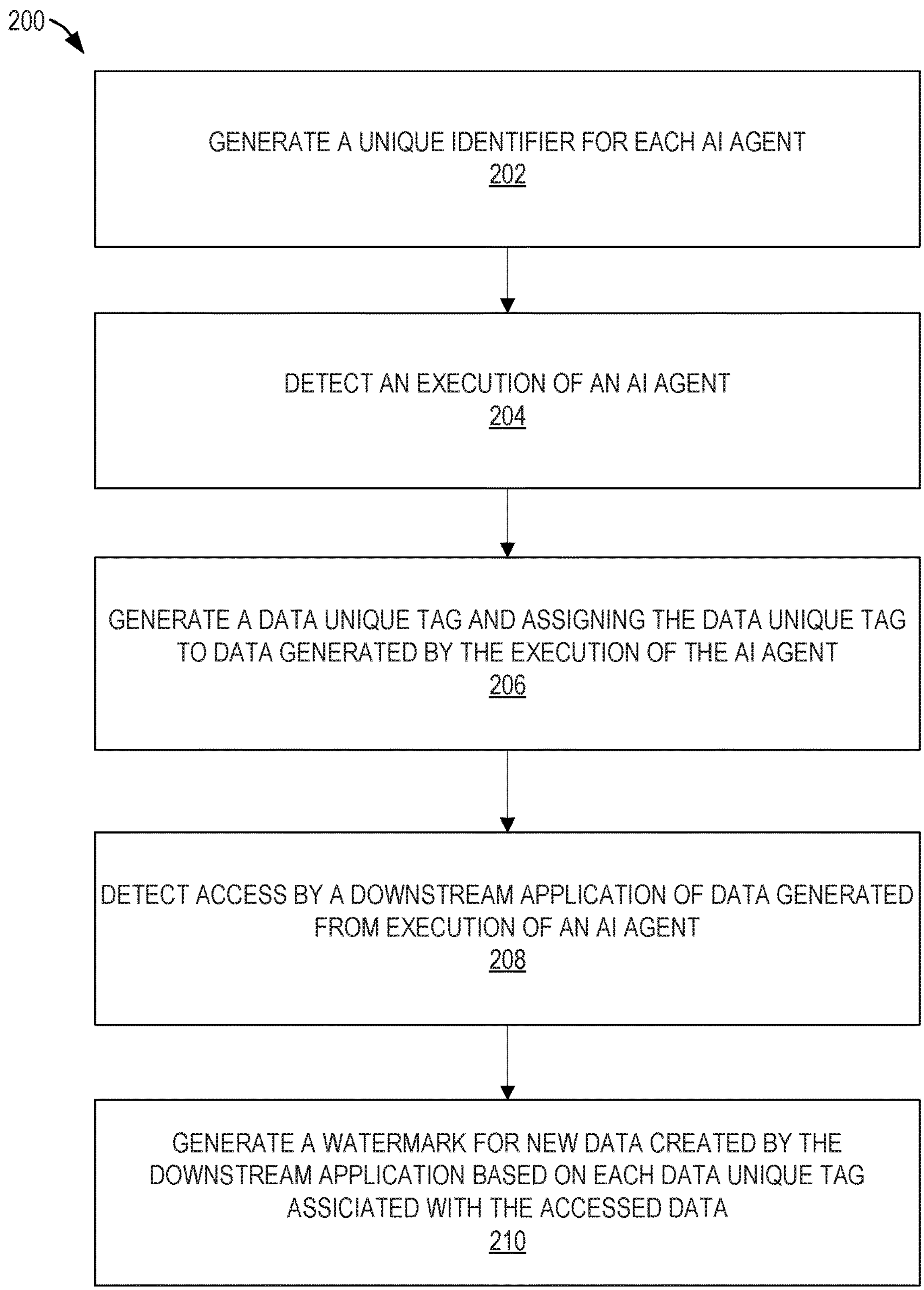
FIG. 2 is a flow chart illustrating aspects of a method for real-time generation of data unique tags and lineage tags, consistent with some examples.

FIG. 2 is a flow chart illustrating aspects of a method 200, according to some example embodiments. For illustrative purposes, method 200 is described with respect to the block diagram of FIG. 1. It is to be understood that method 200 can be practiced with other system configurations in other embodiments.

In operation 202, a computing system, such as the server system 102 or AI traceability system 124, generates a unique agent identifier for each AI agent of a plurality of AI agents utilized in a given networked system. For example, an organization can use a number of different types of machine learning models in various applications through its networked computing system. In some examples, the AI agent is a machine learning model such as a GenAI model, as mentioned above. In some examples, one or more AI agent is a GenAI-powered agent composed by large language model (LLM) instances and Retrieval-Augmented Generation (RAG) pipelines, to generate data by GenAI-powered applications. To achieve traceability at this level, the computing system generates a unique agent identifier for each AI agent, incorporating several metadata elements.

One example metadata element is an application version. The application version identifies the specific version of the business application leveraging the GenAI-powered agent. For example, the application version can be an App Tag that includes an application name and application version. An example format for the App Tag is [App_Name]_[App_Version]. For instance, for an invoice generation application with a version 1.2.0, the App Tag can be generated as: InvoiceGen_1.2.0, in one example.

Other example metadata elements include model (e.g., LLM) specifics. In some examples, the model specifics include a model name, version, and associated parameters used during a particular execution of the AI agent. The parameters can include temperature (e.g., how creative or how conservative the model's output will be), maximum number of tokens, and other parameters. For example, this metadata element can include a Model Tag that includes an LLM name and an LLM version. An example format for the Model Tag is: [LLM_Name]_[LLM_Version]. Using GPT4 with a version 2023.09 as a specific example of a model, the Model Tag can be generated as GPT4_2023.09, for instance.

This metadata element can also include a Parameters Tag that encodes key call parameters, such as temperature and maximum tokens; as mentioned above. An example format for the Parameters Tag is: T [Temperature]_MT [MaxTokens] and a specific example is T0.7_MT1000.

In some examples, the parameters further include nucleus sampling (Top_P), Top_K, frequency and presence penalties, and seed values. By incorporating these specific parameters into the unique agent identifier hash, the AI traceability system 124 provides a deterministic defense against behavioral drift, ensuring that the AI agent's reasoning output remains reproducible and mathematically bound by the authorized identity. This inclusion allows an integrity engine to perform a Hash-on-Load verification that ensures the AI agent's generative "personality" has not been tampered with or altered by "logic poisoning" before a transaction is permitted to execute.

Yet another example metadata element includes a knowledge base version that tracks the versioning of a knowledge base used by the RAG pipeline, including data type/domain and data classification (e.g., confidentiality level). For example, this metadata element can include a Knowledge Base Tag that includes a knowledge base name, a knowledge base version and data classification. An example format for the Knowledge Base Tag is [KB_Name]_[KB_Version]_[Data_Classification] and a specific example is CustomerSupportKB_3.1_Public.

Another example metadata element is a prompt version. A prompt is a message or command to instruct an AI agent to produce a specific output. Prompts can be sentences, questions, data, or the like. This metadata element includes the specific version of a prompt used to query the LLM or RAG system, including any modifications (branching) of templates. For example, this metadata element can include a Prompt Version Tag that tracks evolution of prompt templates, such as PromptV2.0.

The computing system generates the unique agent identifier for each AI agent based on one or more of these metadata elements (e.g., an application name and version, a model name and version of the AI agent, parameters used to execute the AI agent, a knowledge-base version used by the AI agent, and/or a prompt version) and/or other metadata elements. To generate the unique agent identifier, the computing system combines one or more of the above metadata elements as well as any additional metadata elements not discussed here. Using the metadata examples above (App Tag, Model Tag, Parameters Tag, Knowledge Base Tag, and Prompt Version Tag), the computing system can generate a unique agent identifier for a given AI agent, such as: InvoiceGen_1.2.0_GPT4 2023.09_T0.7_MT1000_CustomerSupportKB_3.1_Public_PromptV2.0.

The computing system generates the unique agent identifier for each AI agent upon detecting a release of each AI agent in the given networked system. For example, the computing system determines that a new AI agent has been added or implemented in the given networked system and generates a unique agent identifier for the new AI agent, as explained above. The computing system stores each unique agent identifier for each AI agent that is utilized in the networked system. For example, the unique agent identifiers can be stored in a centralized traceability metadata repository, such as in one or more databases 126. This repository can capture metadata, configuration, context and execution trails for auditing and lookup purposes.

In some examples, during every invocation, the computing system logs the unique agent identifier, the relevant application environmental variables/context, and the timestamp in an immutable Agent Activity Ledger to establish a time-series record of agent usage by business application, across the networked system.

In operation 204, the computing system detects execution of an AI agent in the networked system. For example, the computing system can detect each execution of a plurality of executions for each of a plurality of AI agents utilized in the networked system. For each detected execution, the computing system can perform, in real time or near real time, operations comprising generating a data unique tag and assigning the data unique tag to AI-generated data generated from the execution of the AI agent, as shown in operation 206.

In some examples, the computing system generates the data unique tag based on the unique agent identifier associated with an AI agent that was executed, a time stamp associated with execution, and contextual metadata. In this way, AI-generated data is inherently tied to its originating agent, ensuring a clear attribution feature. The computing system assigns each piece of AI-generated data with metadata that can include a unique agent identifier, a timestamp and context metadata.

The unique agent identifier links the data to the associated AI agent. The timestamp records the time of data generation of the AI-generated data, ensuring chronological traceability. For example, the timestamp can be an ISO-8601 formatted timestamp, such as 2004-12-22T15:45:30Z. The contextual metadata optionally includes additional content, such as the wider business application version and/or the environment variables of the business application version.

The data unique tag can further comprise a sequence number. The sequence number can be used to ensure uniqueness across multiple data outputs (AI-generated data) within a single execution. An example sequence number can be Seq001.

To generate the data unique tag, the computing system can combine one or more of the above elements as well as any additional elements not discussed here. Accordingly, an example data unique tag can include one or more of [UniqueIdentifierAIagent]_[Timestamp]_[SequenceNo]. For instance, using the examples from above an example data unique tag can be: InvoiceGen_1.2.0 GPT4 2023.09 T0.7_MT1000_CustomerSupportKB_3.1_Public_PromptV2.0_2004-12-22T15:45:30Z_Seq001.

In some examples, the computing system stores each data unique tag in an AI Data Registry, such as in one or more databases 126. The AI Data Registry associates generated content with its metadata through the data unique tag.

In one example, the computing system generates a cryptographic hash of the AI-generated data generated from the execution of the AI agent and stores the cryptographic hash (e.g., SHA-256) with the data unique tag associated with the AI-generated data generated from the execution of the AI agent. Using a cryptographic hash can ensure integrity and enable detection of tampering.

In operation 208, the computing system detects that data generated from execution of one or more AI agents of the plurality of AI agents has been accessed by a downstream application. This data is referred to herein as "accessed data." For example, the computing system detects that the downstream application links to or imports data generated from execution of one or more AI agent of the plurality of AI agents.

Based on detection of the accessed data, the computing system generates a watermark, also referred to herein as a "lineage tag," for new data created by the downstream application. The watermark is based on each data unique tag associated with the accessed data, as shown in operation 210. The new data is considered AI-influenced data because it refers to data that has been shaped, modified, or augmented by AI-generated content. To maintain traceability, the computing system embeds system-wide watermarks and relational mappings that capture an attribution to AI-generated data, an attribution to an AI agent, and a cumulative influence record.

For the attribution to AI-generated data, the computing system applies watermarks, or unique identifiers, to AI-influenced data, allowing the computing system to identify which specific AI-generated content contributed to its creation, access, modification or deletion. Each watermark also traces back to the unique agent identifier or the originating AI agent. As for the cumulative influence record, for data influenced by multiple AI-generated data or AI agents, the computing system creates a composite influence record that documents the chain of influence, including all the above for each contributing instance.

This level of traceability ensures that any AI-influenced data can be reverse-engineered to its original AI-generated inputs and associated agents. Such capabilities enable auditing and compliance, detection of potential biases, and verification of model outputs across dynamic system landscapes. By implementing this three-level traceability mechanism, the AI traceability system 124 establishes a robust framework for monitoring and documenting the lifecycle of GenAI-influenced business applications, fostering enterprise-readiness, accountability, transparency, resilience, governance, risk management and compliance adherence.

For example, the new data (e.g., AI-influence data) is tagged with a lineage tag that captures its relationships with both AI-generated data and the originating AI agent. This lineage schema includes the data unique tag (DUT) for the AI-generated data, transformation details, and a timestamp.

A list of all data unique tags for influencing AI-generated data is included. An example format for a single-source influence can be Parent:[DUT_ID] and for multi-source influence, an example format can be: Parent:[DUT_ID1, DUT_ID2, . . . ].

The transformation details indicate how the accessed data was used, such as by describing modification or augmentation process, such as in the format: Transformation:[Summarization]. In some examples, the transformation details include one or more of summarization, text-to-text transformation, augmentation, data generation, data blending, or modifications made to the accessed data (e.g., AI-generated data).

The timestamp is the time when the influence was applied, such as 2024-12-22T16:10:45Z.

To generate the watermark for the new data, the computing system combines one or more of the above elements as well as any additional elements not discussed here. For instance, using the examples from above, an example watermark can be: Parent:[DUT_ID1, DUT_ID2, . . . ]_Transformation:[Summarization]_2024-12-22T16:10:45Z.

The computing system stores the watermark with the new data to enable tracing of AI influence across the given networked system. In some examples, the computing system stores the watermark with the new data by embedding the watermark directly in the new data or applying a cryptographic watermark to the new data. For instance, for structured formats, such as JSON or XML, the watermark can be embedded directly in the data file for the new data. For unstructured formats, such as text or images, a cryptographic watermark is applied, encoding the lineage tag preserving any other feature from the original file.

In some examples, the computing system stores the watermarks in a data lineage registry, such as in one or more databases 126, that enables backtracking from influenced data to its originating sources. The registry also supports queries to identify all downstream influences of specific AI-generated content.

In some examples, the AI traceability system 124 comprises a traceability orchestrator. The traceability orchestrator is a central service configured to coordinate the generation, management, and validation of unique agent identifiers, data unique tags, and lineage tags. It interacts with the Traceability Metadata Repository, AI Data registry, and Data Lineage Registry to maintain comprehensive traceability.

The AI traceability system 124 can further provide APIs (e.g., via API server 120) for seamless integration with business applications, allowing them to tag and trace AI-influenced processes programmatically. By implementing the tagging and centralized registry system, the AI traceability system 124 achieves robust, end-to-end traceability, addressing critical needs for accountability, compliance, and transparency in AI-powered business ecosystems.

The AI traceability system 124 can further provide interfaces to enable display and reporting of information about which AI agents and AI-generated data were used in given AI-influenced data. In this way, the computing system can cause display, on a display of a computing device (e.g., client device 110), of the lineage of the given AI-influenced data, based on the watermark or lineage tag for the given AI-influenced data. The computing system can further generate one or more reports indicating the lineage of various AI-influenced data and cause the generated one or more report to be displayed on a display of a computing device. For example, a user can request a report for data generated by AI or influenced by data generated by AI and the computing system accesses the data lineage registry to generate the report based on the composite influence record that documents the chain of influence, as described above. Accordingly, reporting can further be provided against controls derived from the following AI-focused standards, norms or regulations, e.g., ISO/IEC 42001:2023 (AI Management System Standard), ISO/IEC 23894:2023 (AI Risk Management), ISO/IEC TR 24027:2021 (Bias in AI systems and AI-aided decision making), ISO/IEC 24028:2022 (AI Trustworthiness), ISO/IEC 38507:2022 (Governance implication of AI), IEEE 7000 Series (AI Ethics and Societal Impacts Standards), EU AI Act, EU Ethics Guidelines for Trustworthy AI, NIST AI, Executive Order on Safe, Secure and Trustworthy AI, OECD AI Principles.

The AI traceability system 124 comprises a framework that enables seamless tracking of the data provenance, agent behavior, and process outcomes. This AI traceability system 124 not only enhances operational transparency but also facilitates proactive risk management, bias mitigation, and model improvement through actionable insights delivered from the traceability data and the controls applied to it.

The AI traceability system 124 addresses key technical challenges such as scalability, interoperability with existing business systems, and real-time traceability in dynamic AI-driven environments. By embedding traceability as a core component of AI applications (e.g., GenAI applications), with the AI traceability system 124 organizations gain the control and assurance needed to achieve compliant AI deployments, build robust stakeholder trust, and maximize AI's innovative capabilities, while ensuring alignment with all non-functional requirements.

The AI traceability system 124 further enables fine-grained attribution with the ability to tag and identify version, configuration, and context of AI-powered agents used to generate data. The AI traceability system 124 also enables systematic linking of outputs to inputs by enabling mechanisms to establish clear relationships between generated data and the original agent through robust metadata tagging and timestamping. Further, the AI traceability system 124 provides comprehensive influence mapping using techniques such as watermarking or relational mapping to track the cascading effects of AI-generated data on subsequent processes and outputs.

The AI traceability system 124 further provides for data protection and data privacy, such as anonymized data for privacy, compliance, and legal purposes; protected data using encryption or other method; or ensuring data is not disclosed, such as training data for third-party models. The provided data protection and data privacy can address a given system's requirements for data protection and privacy. As one example, the AI traceability system may not assign prompts to named users. As another example, the AI traceability system 124 may not log responses or database result sets, but instead only log metadata or a query string. Also, certain data may not be disclosed by vendors, including training data sets. Accordingly, the schema has flexibility to accommodate for anonymized, protected or even missing data elements.

The AI traceability system 124 can further protect against user behavior tracking or other system misuse. Each data element, as well as the record as a whole, can be individually protected, access-controlled and monitored. In this way, users or administrators of the AI traceability system 124 can initiate a trace, parcel out different components to different stakeholders, and only allow a given stakeholder access to what the given stakeholder needs to provide the administrator with the information they need for an entire trace. In some examples, access can be restricted, such as by encrypting each data element with its own (symmetric) encryption key. Then access keys will be provisioned to appropriate stakeholders controlling access to the data appropriate only to the respective stakeholder's scope. Finally, a message key can encrypt an entire message, with a message access key provisioned to those who can orchestrate a trace.

Figure 3:
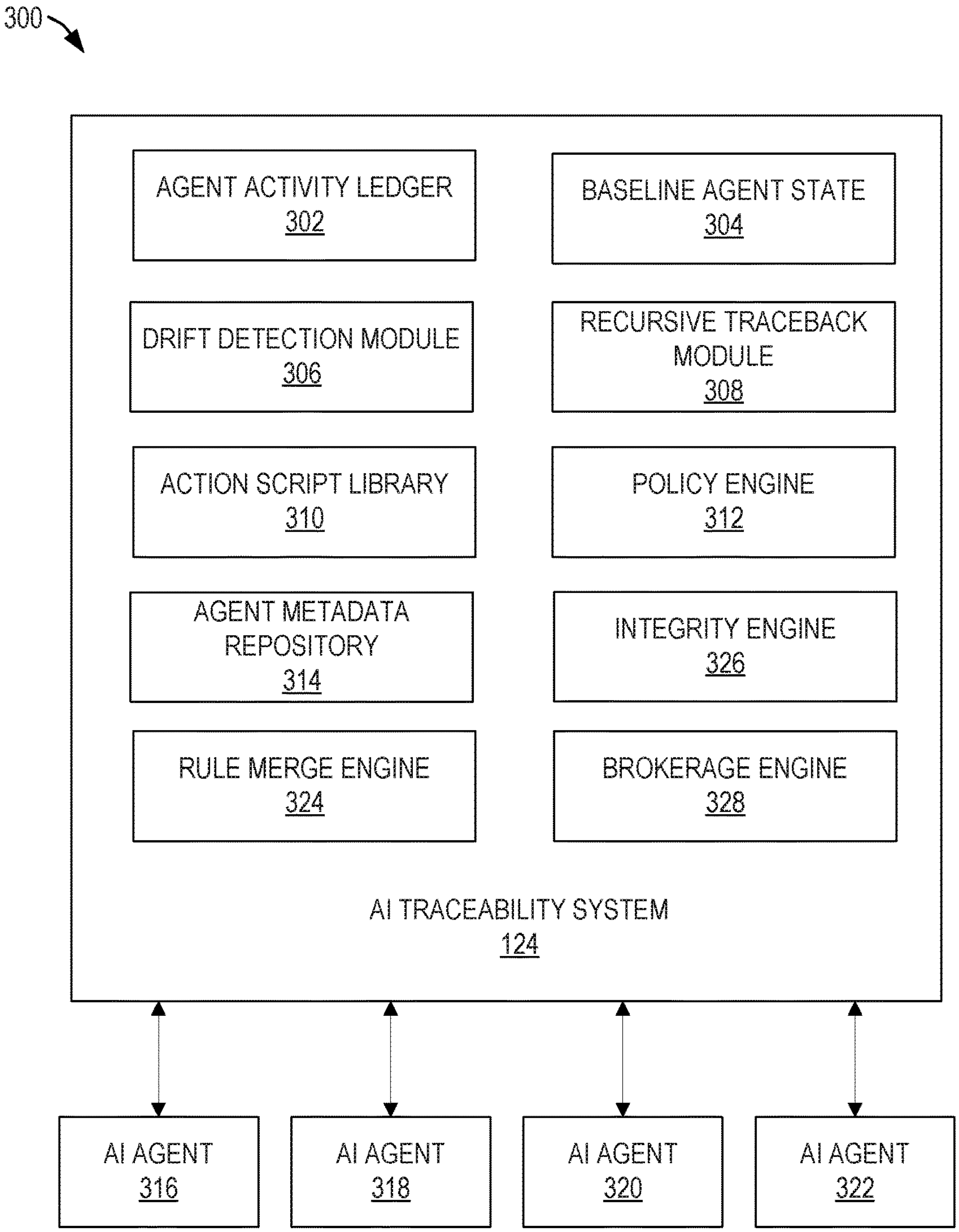
FIG. 3 is a block diagram illustrating example components of an AI traceability system, consistent with some examples.

FIG. 3 is a block diagram 300 illustrating example components of an AI traceability system 124. In this example, the AI traceability system 124 comprises an agent activity ledger 302, a baseline agent state 304, a drift detection module 306, a recursive trace-back module 308, an action script library 310, a policy engine 312, an agent metadata repository 314, a rule merge engine 324, an integrity engine 326, and a brokerage engine 328. The AI traceability system 124 interacts with one or more AI agents 316-322. The one or more AI agents 316-322 can be part of the server system 102, third-party server system 130, and/or other system. It is to be understood that the number of AI agents shown in FIG. 3 is used as an example. Any number of AI agents can be used with the AI traceability system 124.

The agent activity ledger 302 maintains records of AI agent workflows in the form of lineage tags that comprise associated data unique tags, as explained above. The baseline agent state 304 stores baseline values for each AI agent 316-322, indicating expected AI agent behavior, such as thresholds and parameters for what constitutes normal operation of the AI agent, as discussed below. For example, if an AI agent 316 typically processes invoices from $50-$1000, that range would be part of the baseline agent state. The drift detection module 306 monitors AI agents to detect when an AI agent is operating outside of acceptable parameters or thresholds. Using the example above, the drift detection module 306 detects that the AI agent 316 invoices suddenly start clustering toward a higher range of the $50-$1000 range, even if they remain within the range. In this way, the AI traceability system 124 can detect gradual behavioral shifts to intervene proactively before the AI agent 316 exceeds hard limits or produces erroneous outputs.

The recursive traceback module 308 uses lineage tags to trace back through an agent's actions to identify what happened when a problem is detected. For example, when the AI traceability system 124 detects an anomaly or deviation, the recursive trace-back module 308 identifies the relevant lineage tag relevant to the problematic output, rebuilds the data unique tag set by extracting all individual data interactions and operations captured within that lineage tag, and traces backward through the workflow to pinpoint exactly where errors originated. In this way, the AI traceability system 124 can decompose problems to show precisely what the AI agent accessed, which answers it received, and from which sources, to identify the root cause of issues, such as erroneous PDFs or incorrect data inputs.

The action script library 310 stores action scripts that can execute in response to detected anomalies or deviations. For example, when the AI traceability system 124 detects that an AI agent's output has exceeded a threshold or behaves abnormally, it selects and executes an appropriate predefined action from this library. Examples of such actions include quarantining the failing agent, triggering a failover to another agent, or initiating human-in-the-loop review.

In some examples, the policy engine 312 utilizes the rule merge engine 324 to aggregate task-specific rules and organizational treaties at the point of execution. This service generates a temporary, run-time enforcement object that dictates the deterministic boundaries for any given AI agent 316 operation. For example, a policy can include that a given AI agent 316 can pay an invoice plus or minus $50. To address the governance gap and prevent logic poisoning, in some examples, the policy engine 312 utilizes a Dual-Hash Integrity Model to segregate governance into two distinct layers: Task-Level Rules, which are AI agent-specific standard operating procedures (SOPs) defined within the unique agent identifier, and organizational rules, also referred to as Sovereign Fences, which are centralized in an immutable treaty repository. These rules are categorized as agent-level, organizational-level, or regulatory-level (e.g., EU AI Act or NIST RMF standards). The AI traceability system 124 employs a rule merge engine 324, which is a runtime service that uses a templating language to aggregate these segregated rules and create a temporary, in-memory or real-time enforcement object for every specific tool call or transaction. This ensures that even if an AI agent's local logic drifts, it remains physically barred by the broader organizational and regulatory boundaries enforced by the AI traceability system 124.

The agent metadata repository 314 stores information about each AI agent, such as agent characteristics, configurations, and attributes. The policy engine 312 utilizes a dual-hash integrity model to segregate governance into task-level rules (AI agent SOPs) and organizational rules (sovereign fences). These rules are categorized as AI agent-level, organizational-level, or regulatory-level and are retrieved from an immutable treaty repository by the a rule merge engine 324 to define the deterministic boundaries of permissible AI agent behavior.

The rule merge engine 324 aggregates inputs from a policy engine and a rules engine. For example, the rule merge engine 324 aggregates task-specific rules for a given AI agent 316 and organizational treaties at runtime to generate an enforcement object. The AI traceability system 124 can access the rule merge engine 324 to determine if an event generated by a given AI agent 316 matches a predefined rule (e.g., an enforcement object). When the AI traceability system 124 detects a match to an event in the event stream to at least one predefined rule, the AI traceability system 124 executes a hard stop or quarantine of the given AI agent. In this way, the AI traceability system 124 intercepts an event, in real-time, to execute an in-band interrupt and prevent an unauthorized transaction from committing to the system of record.

The integrity engine 326 validates a state of an AI agent 316 against the agent activity ledger 302 and the agent metadata repository 314. In some examples, the integrity engine 326 is configured to verify a cryptographic hash of an AI agent's full configuration, including, for example, its model, system prompt, knowledge base certificates, and non-deterministic configuration parameters (e.g., Temperature, Top_P, Top_K) before permitting a transaction, enforcing a hash-on-load requirement to detect behavioral drift or logic poisoning. In this way, the AI traceability system 124 performs a Hash-on-Load verification via the integrity engine 326, wherein a cryptographic hash of the AI agent's current sampling parameters and knowledge base is compared against a signed baseline to detect logic poisoning prior to execution.

In some examples, the AI traceability system 124 manages an execution lifecycle through specific service domains that operate as a unified security stack. These include the rule merge engine 324 for runtime policy aggregation and the integrity engine 326 for cryptographic identity verification. This can also include a brokerage engine 328 which can serve as a mandatory governance proxy between an AI agent and external systems of record.

For example, the AI traceability system 124 is configured to execute deterministic intercepts for national security systems by retrieving a sovereign treaty comprising a plurality of machine-enforceable regulatory and security constraints from an immutable repository, generating an enforcement object by merging the sovereign treaty with task-level rules at a point of inference, and utilizing a brokerage engine to perform an in-band intercept of an agent tool-call, wherein the tool-call is blocked and the AI agent is quarantined upon detection of a violation of the enforcement object, thereby preventing an unauthorized transaction from committing to a system of record.

Further details about the operations of the AI traceability system are described with respect to FIG. 2 above and FIG. 4 below.

Figure 4:
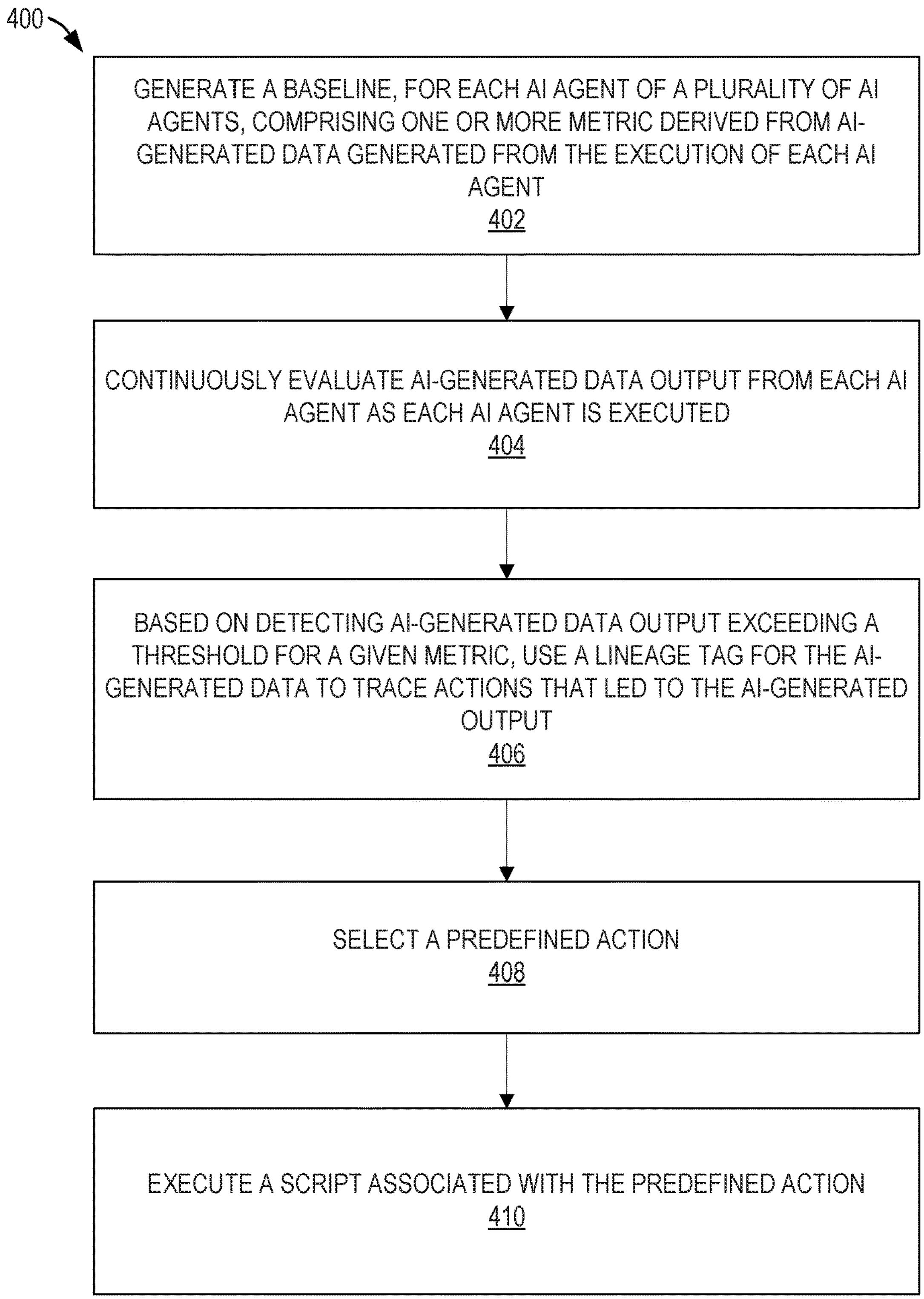
FIG. 4 is a flow chart illustrating aspects of a method for real-time monitoring of a group of AI agents, consistent with some examples.

FIG. 4 is a flow chart illustrating aspects of a method 400 for real-time monitoring of a plurality of AI agents, according to some examples. For illustrative purposes, method 400 is described with respect to the block diagram of FIG. 1 and FIG. 3. It is to be understood that method 400 can be practiced with other system configurations in other embodiments.

In operation 402, a computing system, such as the server system 102 or AI traceability system 124, generates a baseline for each AI agent of a plurality of AI agents. For example, each AI agent of the plurality of AI agents can be identified by a unique agent identifier in the AI data registry. The baseline comprises one or more metric derived from AI-generated data generated from the execution of each AI agent. In some examples the one or more metric is an average, a maximum, a minimum, or a value range for a given task. In other examples, the one or more metric comprises at least one of an error rate, latency, token usage, cost per output, output length, confidence score, or frequency of downstream human correction. The baseline for each AI agent can be stored in one or more databases 126, such as a baseline agent state 304.

For example, the computing system, for each detected execution of a plurality of executions of a plurality of AI agents in a given networked system, generates, in real time or near real time, a data unique tag comprising a unique agent identifier associated with an AI agent that was executed, a time stamp associated with execution, and contextual metadata, and assigns the data unique tag to AI-generated data generated from the execution of the AI agent. These functions can be performed as described above with respect to operations 202-206 of FIG. 2. The data unique tags generated from each respective execution are stored in an AI data registry.

The computing system generates a lineage tag for new data created by each downstream application, the lineage tag based on each data unique tag associated with AI-generated data generated by one of more of the plurality of AI agents used to generate the new data. This function can be performed as described above with respect to operations 208-210 of FIG. 2 (also referred to herein as a watermark). For example, a first AI agent may be used to find a purchase order that matches an invoice and a second AI agent may be used to determine information about an entity to be paid in the purchase order to determine an entity to pay for the invoice. The computing system generates a first data unique tag from execution of the first AI agent and a second data unique tag from execution of the second AI agent. The computing system generates a lineage tag using at least the first data unique tag and the second data unique tag. In some examples, the lineage tag is further based on transformation details indicating how the AI-generated data was used and/or metadata describing modifications made to the AI-generated data. The lineage tag can be stored in one or more data stores. In some examples, the lineage tag is stored with the new data by embedding the lineage tag directly in the new data or applying a cryptographic watermark to the new data.

The computing system generates a baseline for each AI agent of the plurality of AI agents identified by a unique agent identifier in the AI data registry by analyzing the AI-generated output for the AI agent to determine values relevant to performance, quality, risk, cost, or the like. The computing system can determine an average of the values, a maximum value, a minimum value, a range of values, or other measure, to determine the one or more metric. Using a simple example, an AI agent can be responsible for paying invoices for a given entity. In analyzing AI-generated output from the AI agent, the computing system determines that the AI agent has historically paid a maximum of $3000 for an invoice and sets the maximum value to $3000. The computing system can further determine, from averaging all payments of invoices made by the AI agent, that the average payment made by the AI agent is $1850. The computing system can then use these values to detect if the AI agent performs out of a normal range, as described below. In this way the computing system can establish a "steady state" understanding of normal, healthy behavior for each AI agent in a group of AI agents to serve as a baseline for management of the AI group.

In operation 404, the computing system continuously evaluates AI-generated data output from each AI agent as each AI agent is executed, to detect an output exceeding a threshold for a given metric. In this way, the computing system can determine if an AI agent is running more or less often than expected, if an AI agent's failure rate is suddenly spiking, if an AI Agent is suddenly accessing a new data source or being invoked by an unauthorized user, any anomalies, and so forth.

A threshold can be a predefined value, a standard deviation, a percentage of a given metric, or the like. For example, the threshold can be a given metric, such as a minimum value, a maximum value, a range of values, or the like. In other examples, the threshold can be a standard deviation or a percentage of a given metric (e.g., up to 10% above a maximum value or up to 25% below a minimum value). An output exceeding a threshold for a given metric indicates that a respective AI agent is not performing as it has performed historically and could indicate an error in the performance of the AI agent.

The computing system compares the AI-generated data output from each AI agent against the threshold for a given metric to determine if the output exceeds (or is less than) the threshold. For example, if an AI agent has made a maximum payment historically of $3000, as in the example above, and the AI-generated data output from the AI agent is $100,000, the computing system would compare this to the threshold for the maximum payment value. As mentioned above, threshold is a predefined value, such as the maximum payment value itself, a value over or under the maximum value (e.g., $5000), 25% over the metric, or other predefined value. For example, if the threshold was up to 25% over the maximum value, the computing system would determine that $100,000 is over the threshold of the maximum value metric of $3000.

As another example, the metric may be an error rate. For example, the computing system can determine that a given AI agent typically has a 2% error rate and a threshold for this error rate metric can be 10% error rate. If the error rate for the given AI agent jumps up to 15%, the computing system would determine that 15% is over the 10% threshold.

In some examples, continuously evaluating the AI-generated data output comprises applying a machine learning model configured to detect deviations from the baseline. For example, the computing system, using a machine learning model, can automatically flag an AI agent that drifts from a typical range or typical behavior, as described above. One example of a machine learning model includes a specialized anomaly detection model, such as Isolation Forests or Long Short-Term Memory (LSTM) autoencoders. For example, isolation forests can be utilized to identify outliers in high-dimensional metadata, such as when an AI agent suddenly requests a high-sensitivity data class like personally identifiable information (PII) that it has never accessed before. LSTM autoencoders can be used to process time-series data from the agent activity ledger to detect temporal anomalies, such as a spike in error rates or latency that indicates a model driver of API degradation. Further, clustering (e.g., K-Means) can be used to group AI agents into behavioral profiles based on UAI metadata to automatically flag any agent that drifts into a cluster associated with a high-risk or underperforming status.

In operation 406, the computing system uses a lineage tag for the AI-generated data to trace actions that led to the AI-generated data output, based on detecting AI-generated data output exceeding a threshold for a given metric. For example, the computing system uses the lineage tag to trace actions that led to the AI-generated data output by reconstructing, from the lineage tag, an ordered sequence of process steps, inputs, and intermediate outputs with timestamps.

For example, the computing system identifies the lineage tag for the AI-generated data by looking it up in the AI data registry. Because the lineage tag serves as the comprehensive wrapper representing the end-to-end downstream process, the computing system utilizes the lineage tag to identify all constituent data unique tags that contributed to the outcome to reconstruct the lineage from the first process step downstream to the last. A process consists of at least one lineage tag and one corresponding data unique tag with complex workflows comprising a single lineage tag that wraps a plurality of unique agent identifiers associated with data unique tags generated over time. The computing system then collects each data unique tag that contributed to the AI-generated data output based on the lineage tag. The computing system assembles an ordered sequence by timestamp from the collected data unique tags to reconstruct the process steps and artifacts that led to the AI-generated output. By assembling an ordered sequence, the computing system can isolate exactly which prompt version model tag, knowledge base artifact, and so on, triggered an issue in a complex multi-agent flow. This reconstruction enables deep traceability drill-down, allowing the computing system to isolate the exact broken line, such as a specific Retrieval Augmented Generation (RAG) pipeline version or an outdated prompt, without necessitating the deactivation of the entire group of AI agents.

This data, comprising the reconstructed process steps and artifacts, is then used in operation 408. In operation 408, the computing system selects a predefined action comprising at least one of quarantining the AI agent to prevent further execution or initiating a workflow to use the actions (e.g., process steps and artifacts) traced from the data unique tag. For example, the computing system can determine that predefined conditions exist to deactivate the AI agent and automatically set the AI agent to a status of "inactive" to prevent the AI agent from further executing. In some examples, an alert can be sent to a computing device associated with a human to review and investigate the issue further. In another example, the computing system determines that predefined conditions exist to execute a given script for the predefined action.

In some examples, the computing system utilizes a customizable rule engine to map specific threshold breaches to predefined action workflows. For instance, logic mapping can be used if an error is classified as a security/governance error, such as an unauthorized user invocation of a sensitive unique agent identifier, so that the computing system executes a quarantine script that programmatically updates the AI agents' lifecycle status to "inactive" and revokes its API access tokens. As another example, logic mapping can be used if an error is classified as a performance/reliability error, such as when a primary model latency exceeds 10%, such that the computing system executes a failover script. The failover script diverts traffic to a secondary model configuration (e.g., failing over from GPT-4 to Claude-3) as validated by previous chaos engineering tests and optimizations.

In yet another example, the computing system can trigger external workflows via an API, such as automatically creating a high-priority problem ticket in a service management system (e.g., ITIL system or ServiceNow) and include the full lineage data for further investigation.

In these ways the computing system can utilize a customizable rule engine to map to specific breaches such as active quarantining (e.g., programmatically updating an AI agent's status to inactive or deprecated to block execution), active interception (e.g., intercepting and blocking execution if an agent attempts to access an unauthorized data sensitivity class, such as PII failover and continuity), automatically shifting traffic to a secondary model configuration (e.g., failing over from a first type of AI model to a second type of AI model) based on mechanisms validated by resilience testing, feedback loops identifying AI agents with outputs that are frequently modified by humans and automatically flagging associated prompt tags for refinements, and so forth.

In operation 410, the computing system executes a script associated with the predefined action. In some examples, the computing system can ensure that the script executes correctly. For example, the computing system can determine that the script failed or produced an error and generate a report comprising a threshold exceeding metric, the data unique tag, and actions traced from the data unique tag. In this way the computing system translates insight into targeted interventions by executing predefined script-based workflows.

Figure 5:
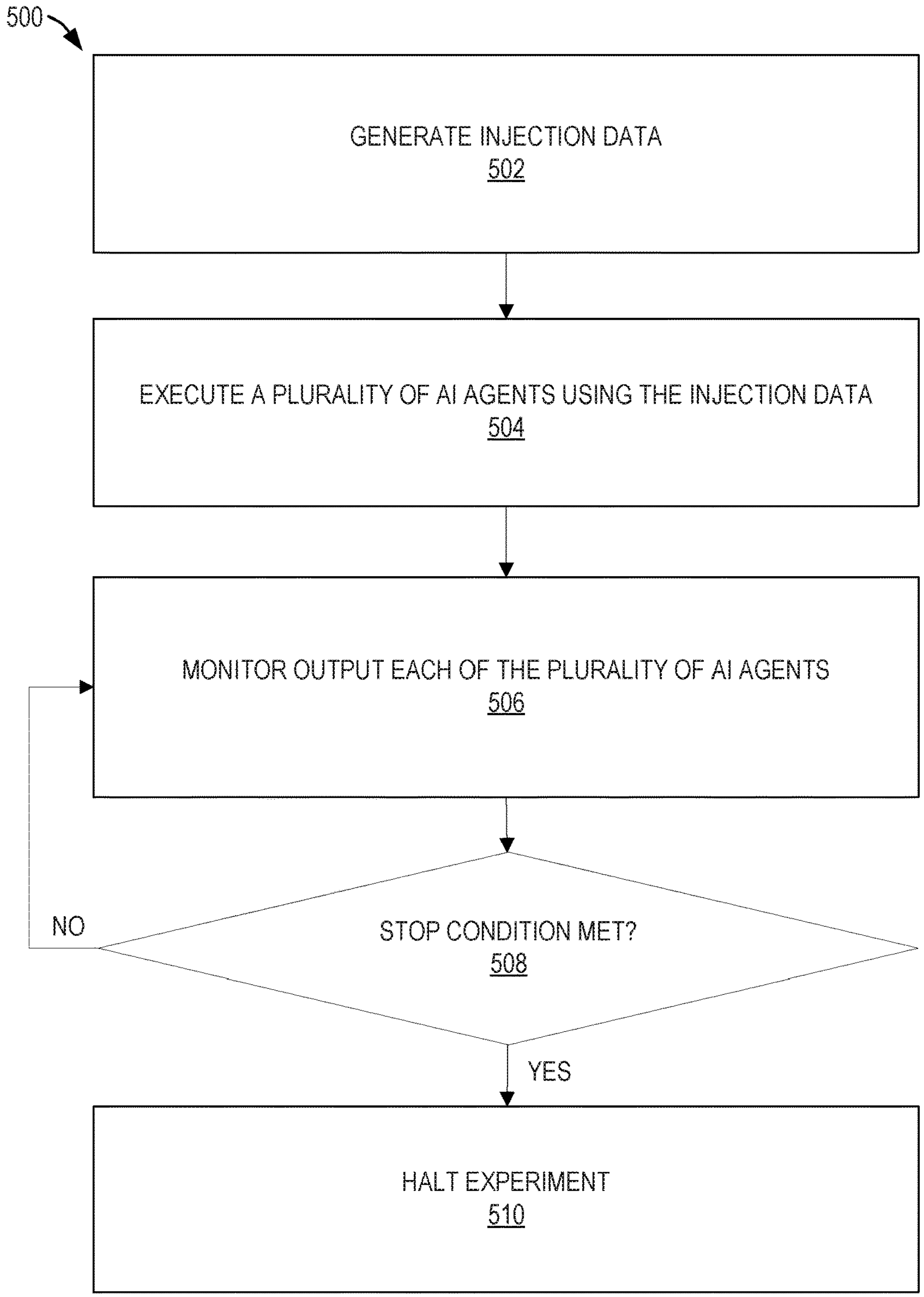
FIG. 5 is a flow chart illustrating aspects of a method for evaluating performance of AI agents, consistent with some examples.

FIG. 5 is a flow chart illustrating aspects of a method 500 for evaluating the performance of AI agents, according to some examples. For illustrative purposes, method 500 is described with respect to the block diagram of FIG. 1. It is to be understood that method 500 can be practiced with other system configurations in other embodiments.

In operation 502, a computing system, such as the server system 102 or AI traceability system 124, generates injection data to test the performance of one or more of a plurality of AI agents. Injection data refers to intentionally faulty or malicious data that is artificially generated and introduced in a production system as part of a proactive AI resilience testing mechanism. For example, injection data can include bad or manipulated data, such as invoices with hidden instructions in white text that attempt to trick AI agents into performing unauthorized actions. Injection data can further include mislabeled documents, like a maintenance PDF for a 2003 Tacoma mislabeled as a 2001 Tacoma, to cause an AI Agent to retrieve incorrect part numbers. Another example of injection data is mismatched information, such as randomly generated part numbers or invoices designed to create errors. Injection data can also include data designed to simulate malicious behavior and test if AI agents can be hacked or manipulated.

The injection data can be generated automatically by a separate AI agent that deliberately introduces errors to validate that the computing system properly detects and handles anomalies without impacting production operations. The injection data can be stored in one or more databases 126 that AI agents can access during their normal operations. For example, the injection data is injected into the same data sources that production AI agents use with automated stop conditions to prevent it from degrading the overall production system.

In operation 504, the computing system executes a plurality of AI agents as normal in a production system. The computing system monitors output of each of the plurality of agents in operation 506 for any stop condition. The computing system determines if a stop condition is met in operation 508. If a stop condition is not met (NO), the computing continues monitoring the output of each of the plurality of AI agents at operation 506, and if a stop condition is met (YES), the computing system halts the experiment at operation 510.

A stop condition is an automated threshold that halts the experiment if it begins to negatively impact the production system's performance. The stop conditions are defined based on real-time metrics and monitor system performance indicators. Examples of system performance indicators include the experiment consuming too much computational resources, such as processing power/CPU usage, memory utilization if the system is running out of available memory, processing time if one or more AI agent takes too long to complete tasks, and overall system performance degradation, which is any metric indicating that the production system is being affected. The purpose of the stop conditions is to ensure that while the resilience testing uses real production AI agents and infrastructure, it will not degrade actual production system operations. If stop conditions are triggered, the experiment halts, and an investigation begins into the cause of the performance impact.

A stop condition can further include an AI agent exceeding a threshold, as described above with respect to FIG. 4, where an AI agent deviates from a steady state or exceeds a baseline. If an AI agent exceeds a threshold, such as paying a higher-than-normal invoice or ordering a disproportional amount of materials, a stop condition is met in 508, and the computing system halts the experiment at operation 510.

Once the experiment is halted during operation 510, the AI agents' performance can be evaluated to determine why the experiment caused the production system to degrade or why the AI agents exceeded a threshold. For example, the computing system examines what triggered the stop condition, reviews which AI agents were active during the degradation, and analyzes the technical metrics that exceeded thresholds. The computing system can further leverage the lineage tags to decompile what happened, as explained above with respect to FIG. 4. The investigation determines whether the issue was caused by insufficient system resources (e.g., not enough memory for the number of AI agents running), problematic AI agent behavior, and/or faulty data injection scenarios. The computing system can further verify that AI agents successfully transitioned from an anomalous lineage tag state to a recovery workflow without manual intervention. The AI agents can be updated appropriately based on the findings in the investigation.

In some examples, the AI traceability system 124 provides for agentic metering. For example, the AI traceability system 124 can ingest, monitor, and meter agentic output by counting the generation of lineage tags or directed acyclic graphs (DAGs). This can be used for tracking and traceability purposes, as previously discussed, as well as for transactional purposes. For instance, unlike legacy "per-seat" models, this mechanism allows for monetization of AI by tracking business KPIs derived from out-of-process metrics. Specifically, the volume and quality of work performed, including both successful and unsuccessful outputs can be tracked. This addresses an industry gap where large software vendors struggle to accurately meter and price autonomous agent labor.

In some examples, the AI traceability system 124 also provides cryptographic hashing of non-lineage input data. For example, the AI traceability system 124 provides a mechanism that automatically generates a unique cryptographic hash for any input data (e.g., PDF, database record, or file) consumed by an AI agent that does not arrive with a pre-existing Lineage Tag. In this way, any issues can be traced back to any output from an AI agent or to a particular input data, such as a PDF, database record, or file, to determine the ultimate source of an issue.

In some examples, the AI traceability system 124 uses a cryptographic hash-chain and checksum to construct lineage tags and data unique tags such that a change to any one record breaks the validation mechanism of the entire chain, guaranteeing reliable records.

Further, the AI traceability system 124 is configured to surface partial matches between captured input and subsequent output data. This is achieved through a multi-dimensional analysis using a combination of vector and graph databases paired with artifact embeddings to identify subtle correlations and/or high-probability matches where deterministic exact-match hashing is insufficient—essentially being able to answer the question "Have you seen this?" This creates a "system memory" for an agentic information tracking system, allowing the AI traceability system 124 to identify if specific data has been previously processed or is logically related to existing records. This ensures a ground-truth integrity and fraud prevention when agents interact with legacy systems or non-agentic data sources.

Figure 6:
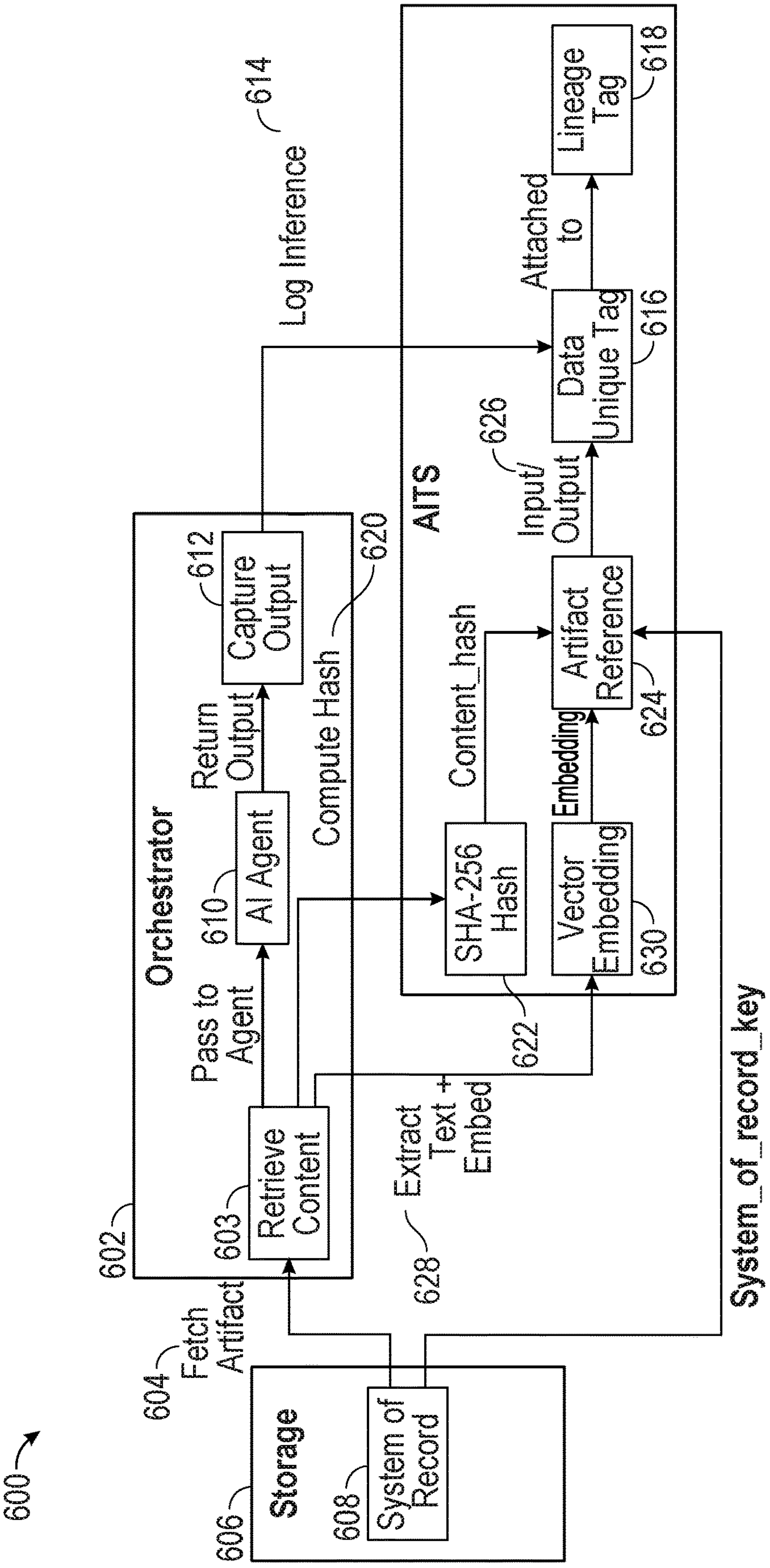
FIG. 6 is a diagram of a cryptographic hashing function and multi-dimensional function of the AI traceability system, consistent with some examples.

FIG. 6 is a diagram 600 illustrating the cryptographic hashing function and the multi-dimensional function of the AI traceability system 124. An orchestrator 602 of the AI traceability system 124, retrieves content 603, which can include one or more artifacts 604, from a system of record 608 on one or more storage device 606, such as one or more databases 126 and/or 134. The orchestrator 602 passes the one or more artifacts 604 to an AI agent 610 that returns an output, shown as capture output 612, logged at 614 and a data unique tag 616 is generated for the capture output 612 and attached to a lineage tag 618.

A hash for the one or more artifacts is computed at 620, such as using SHA-256 hash 622. It is to be understood that any number of cryptographic functions can be used to compute the hash of the one or more artifacts to create a fingerprint of an artifact (e.g., document) to determine whether a document is an exact copy or not. The hash 622 is stored as an artifact reference 624 and input/output 626 as part of the data unique tag 616, which is attached to the lineage tag 618.

The AI traceability system 124 can further extract text (or other features) from the one or more artifacts at 628 to generate a vector embedding 630 of the text or other features, which are also stored as an artifact reference 624 and input/output 626 as part of the data unique tag 616, which is attached to the lineage tag 618. Accordingly, the artifact reference 624 is tied to the data unique tag 616 and lineage tag 618.

The AI traceability system 124 can then determine whether a given artifact (e.g., a PDF of an invoice) is the same as one used by an AI agent 610 by creating a hash of the given artifact and comparing it with the hash stored in the artifact reference 624. In this way, the AI traceability system 124 can determine if the given artifact and an artifact used by the AI agent 610 are the same and thus, part of an associated data unique tag.

In another example, the AI traceability system 124 can extract a portion of the invoice PDF and search the vector embedding 630 to find the corresponding unique tag. For example, if a user wanted to find all the data unique tags for a given vendor X, the user could use the AI traceability system 124 to search for vendor X in the vector embeddings 630 to determine data unique tags 616 related to vendor X. In this way, if a user only had part of a document or knows data that would be in a document, they can locate the lineage tag 618 without having the actual artifact.

In some examples, the AI traceability system 124 includes controls for in-flight interrupts and corrections for active governance. For example, an in-band subcomponent of the AI traceability system 124 monitors an event stream in real time for matches to both deterministic and non-deterministic rules, executing a hard stop or quarantine when a logical semantic anomaly is detected. Accordingly, the AI traceability system 124 is configured for passive observability (after the fact) and real-time, in-flight correction. The AI traceability system 124 triggers actions such as terminating a work in progress or quarantining the agent based on these rules, essentially double-checking the output before allowing a transaction to commit to the system of record. This mitigates a faithfulness gap, where AI rationales are fabricated, by catching errors at an atomic level before they impact the system record, such as a financial ledger.

In some examples, the AI traceability system 124 further implements a Hash-on-Load requirement through an integrity engine. For example, before permitting any transaction to commit to a system of record, the AI traceability system 124 re-computes the hash of the active AI agent's rules, configuration (e.g., including sampling parameters such as temperature, Top_P, and Top_K), and environment, comparing it against the original signed hash in the AI agent activity ledger. In some examples, any variance between these hashes results in a mandatory hard stop.

By implementing in-band interrupts and advanced partial matching, the creation of the lineage tag becomes a non-negotiable step that can stop a transaction in its tracks. In this way, before an AI agent completes a task and actually writes something in a system of record, the AI traceability system 124 can look at the data unique tag level and inspect it against given rules to determine if everything looks correct before writing anything in a system of record or to stop the AI agent from writing anything to the system of record if there is an error, such as a hallucination or other issue.

For example, the AI traceability system 124 detects anomalies through a pipeline that operates on the real-time event stream produced by AI agent operations. As each AI agent performs work, the AI traceability system 124 receives events as they occur and before they are written to the system of record. The AI traceability system 124 receives each event and applies rules to the events. For example, the AI traceability system 124 can use several types of rules, such as deterministic or non-deterministic rules.

Deterministic rules comprise direct value comparisons and logical conditions. For instance, an AI agent matches a purchase order and invoice correctly on all fields, but then selects a historical price instead of the current price for payment. A deterministic rule comparing the payment amount against the PO/invoice amount would identify this mismatch.

Non-deterministic rules use AI inference to evaluate the event. The AI traceability system 124 employs one or more AI models to assess whether the AI agent's output is consistent or anomalous. Further, the AI traceability system 124 can use statistical rules, such as linear regression, to establish a baseline from historical data and identify deviations from that baseline. An event that falls outside expected parameters relative to accumulated data would register as an anomaly.

When the AI traceability system 124 matches a rule, it can flag the lineage tag for review, send notifications to a human operator, run a script to terminate the AI agent's job, or the like.

For example, the AI traceability system 124 monitors an event stream for a given AI agent to determine if any event in the event stream matches a predefined rule (e.g., via rule merge engine 324). The predefined rule can be a deterministic or non-deterministic rule as explained above. When the AI traceability system 124 detects a match to an event in the event stream to at least one predefined rule, the AI traceability system 124 executes a hard stop or quarantine of the given AI agent. In this way, the AI traceability system 124 intercepts an event, in real-time, to execute an in-band interrupt and prevent an unauthorized transaction from committing to the system of record.

In one example, detecting a match to an event in the event stream to a predefined rule comprises comparing a cryptographic hash of current sampling parameters and knowledge base of the given AI agent against a signed baseline to detect logic poisoning prior to execution (e.g., via integrity engine 326). In this way, the AI traceability system 124 performs a Hash-on-Load verification via an Integrity Engine, wherein a cryptographic hash of the AI agent's current sampling parameters and knowledge base is compared against a signed baseline to detect logic poisoning prior to execution. Logic poisoning refers to a change to settings, such as an AI agent configuration (e.g., parameters) or data files (e.g., knowledge base), to make the AI agent behave unpredictably without changing the underlying model code for the AI agent. In some examples, when an AI agent is first authorized, its entire state, including its specific prompt, model version, and parameters (e.g., temperature, etc.), is hashed into a unique agent identifier and cryptographically signed. Each time the AI agent is loaded to perform a task, the AI traceability system 124 rehashes the live environment. If the rep-computed hash does not batch the signed baseline, the AI traceability system 123 knows the AI agent has drifted or been tampered with and can execute a hard stop before any text is generated or a tool call is made.

In one example, detecting a match to an event in the event stream to a predefined rule comprises comparing the event to an enforcement object. The enforcement object can comprise organizational rules from a treaty repository. For example, the AI traceability system 124 can aggregate task-specific rules from the unique agent identifier and organizational rules from a treaty repository to generate an in-memory enforcement object at the point of a tool call. If an AI agent's proposed action contradicts any part of this enforcement object, the AI agent's action is blocked.

Figure 7:
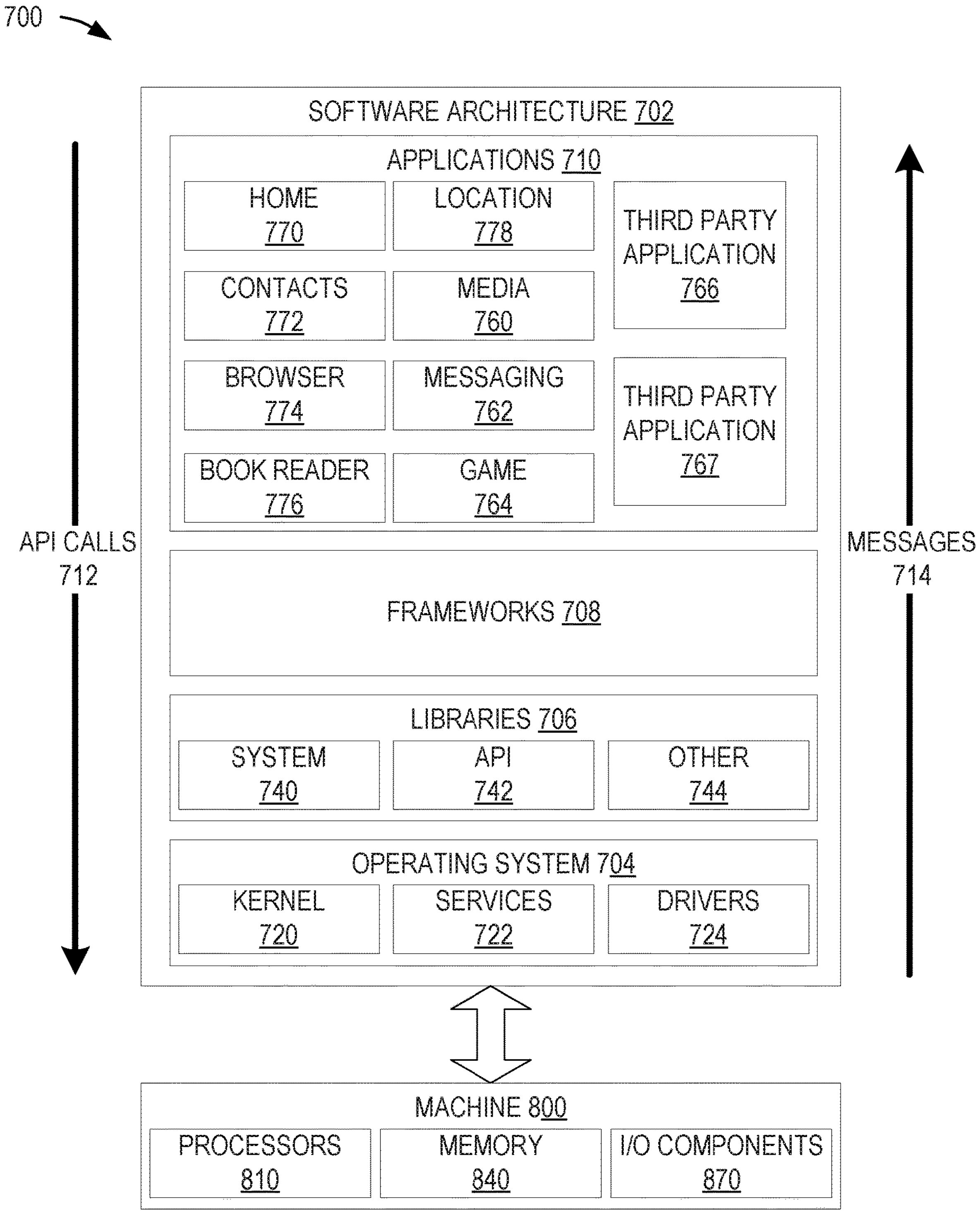
FIG. 7 is a block diagram illustrating an example of a software architecture that may be installed on a machine, consistent with some examples.

FIG. 7 is a block diagram 700 illustrating software architecture 702, which can be installed on any one or more of the devices described above. For example, in various embodiments, client devices 110 and servers and systems 130, 120, 122, and 124 may be implemented using some or all of the elements of software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various embodiments, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionalities. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 770, a contacts application 772, a browser application 774, a book reader application 776, a location application 778, a media application 760, a messaging application 762, a game application 764, and a broad assortment of other applications such as third-party applications 766 and 767. According to some embodiments, the applications 710 are programs that execute defined functions. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the developer of any particular platform) may be mobile software running on a mobile operating system such as IOS™, ANDROID™, WINDOWS® Phone, or another mobile operating system. In this example, the third-party application 766 can invoke the API calls 712 provided by the operating system 704 to invoke or leverage the functionality described herein.

Figure 8:
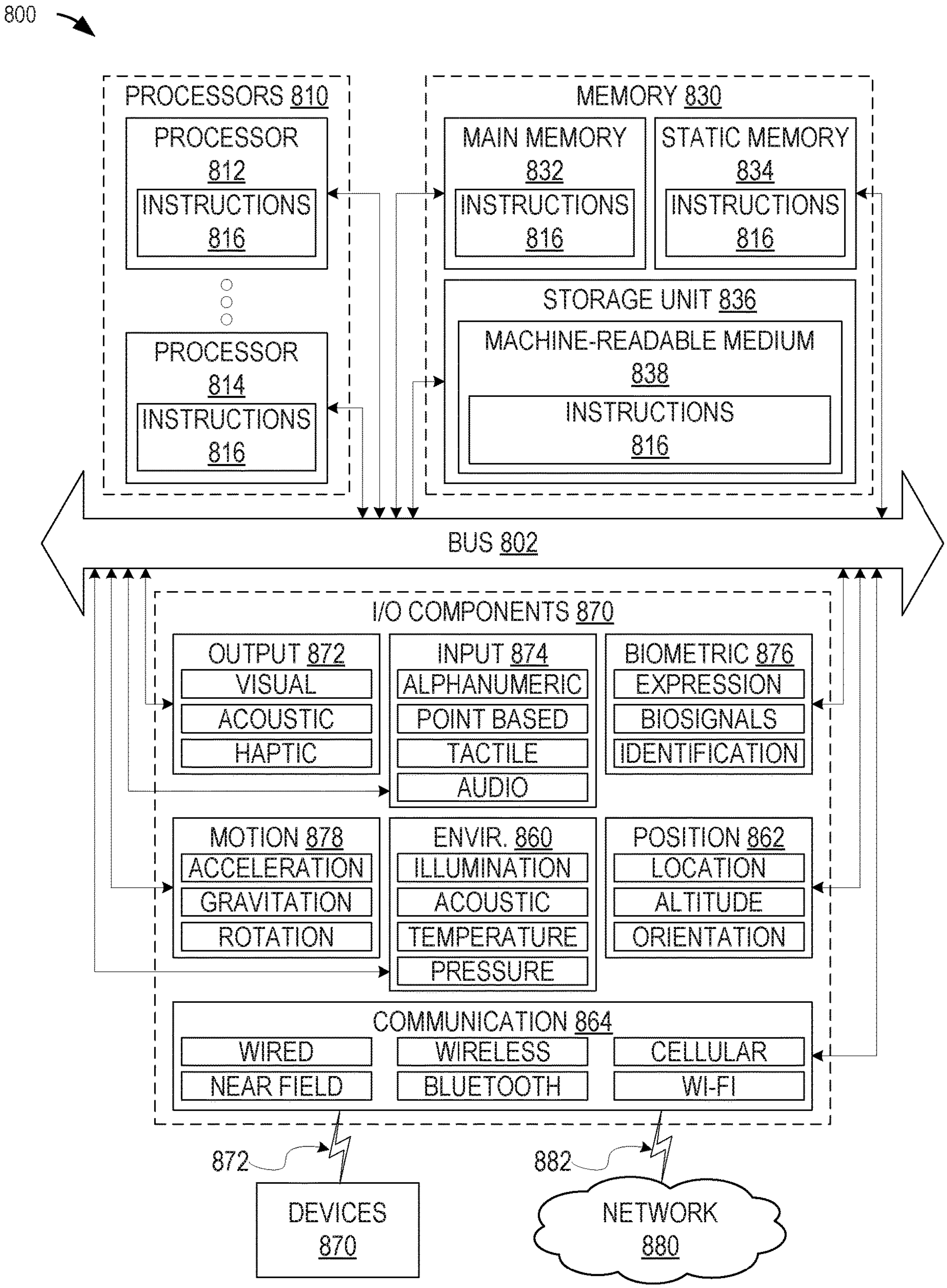
FIG. 8 illustrates a diagrammatic representation of a machine, in the form of a computer system, within which a set of instructions may be executed for causing the machine to perform any one or more of the methodologies discussed herein, consistent with some examples.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or system 130, 102, 120, 122, 124, etc., or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiples cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 872 and input components 874. The output components 872 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 874 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 876, motion components 878, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of several well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for real-time monitoring a plurality of artificial intelligence (AI) agents, comprising:

assigning, for each detected execution of a plurality of executions of the plurality of AI agents in a given networked system, a data unique tag to AI-generated data generated from execution of an AI agent, the data unique tag comprising a unique agent identifier associated with an AI agent that was executed, a time stamp associated with execution, and contextual metadata;

generating a lineage tag for new data created by each downstream application, the lineage tag based on each data unique tag associated with AI-generated data generated by one of more of the plurality of AI agents used to generate the new data;

generating a baseline, for each AI agent of the plurality of AI agents identified by a unique agent identifier, comprising one or more metric derived from AI-generated data generated from the execution of each AI agent;

evaluating continuously AI-generated data output from each AI agent as each AI agent is executed, to detect an output exceeding a threshold for a given metric;

detecting AI-generated data output exceeding a threshold for a given metric and using a lineage tag for the AI-generated data to trace actions that led to the AI-generated data output;

selecting a predefined action comprising at least one of quarantining the AI agent to prevent further execution or initiating a workflow to use the actions traced from the lineage tag; and executing a script associated with the predefined action.

2. The computer-implemented method of claim 1, wherein the one or more metric is an average, a maximum, a minimum, or a value range for a given task.

3. The computer-implemented method of claim 1, wherein the one or more metric comprises at least one of an error rate, latency, token usage, cost per output, output length, confidence score, or frequency of downstream human correction.

4. The computer-implemented method of claim 1, wherein the threshold is at least one of a minimum value, a maximum value, or a standard deviation.

5. The computer-implemented method of claim 1, wherein exceeding the threshold indicates a respective AI agent is not performing as it has performed historically.

6. The computer-implemented method of claim 1, further comprising:

determining that the script failed or produced an error; and generating an alert comprising a threshold exceeding metric, the data unique tag and actions traced from the data unique tag.

7. The computer-implemented method of claim 1, wherein continuously evaluating the AI-generated data output comprises applying a machine learning model configured to detect deviations from the baseline.

8. The computer-implemented method of claim 1, wherein using the lineage tag to trace actions that led to the AI-generated data output comprises reconstructing, from the lineage tag, an ordered sequence of process steps, inputs, and intermediate outputs with timestamps.

9. The computer-implemented method of claim 1, further comprising:

storing, in one or more data stores, generated data unique tags from each respective execution; and storing, in the one or more data stores, generated lineage tags with new data created by each downstream application.

10. The computer-implemented method of claim 9, wherein storing the lineage tag with the new data comprises embedding the lineage tag directly in the new data or applying a cryptographic watermark to the new data.

11. The computer-implemented method of claim 1, wherein the lineage tag further based on at least one of transformation details indicating how accessed AI-generated data was used or metadata describing modifications made to the accessed AI-generated data.

12. The computer-implemented method of claim 1, further comprising:

detecting that a downstream application links to or imports AI-generated data generated from execution of one or more AI agents of the plurality of AI agents.

13. The computer-implemented method of claim 1, wherein the unique agent identifier for each AI agent is based on an application name and version, a model name and version of the AI agent, parameters used to execute the AI agent, a knowledge-base version used by the AI agent, and a prompt version.

14. The computer-implemented method of claim 1, wherein the data unique tag further comprises a sequence number.

15. The computer-implemented method of claim 1, further comprising:

monitoring an event stream for a given AI agent;

detecting a match to an event in the event stream to a predefined rule; and based on detecting the match, executing a hard stop or quarantine of the AI agent.

16. The computer-implemented method of claim 15, wherein detecting a match to an event in the event stream to a predefined rule comprises comparing a cryptographic hash of current sampling parameters and knowledge base of the given AI agent against a signed baseline to detect logic poisoning prior to execution.

17. The computer-implemented method of claim 15, wherein detecting a match to an event in the event stream to a predefined rule comprises comparing the event to an enforcement object, the enforcement object comprising organizational rules from a treaty repository.

18. The computer-implemented method of claim 1, further comprising:

executing deterministic intercepts for national security systems by retrieving a sovereign treaty comprising a plurality of machine-enforceable regulatory and security constraints from an immutable repository;

generating an enforcement object by merging the sovereign treaty with task-level rules at a point of inference; and performing an in-band intercept of a given AI agent tool-call, wherein the tool-call is blocked and the given AI agent is quarantined upon detection of a violation of the enforcement object, preventing an unauthorized transaction from committing to a system of record.

19. A system for real-time monitoring of a plurality of artificial intelligence (AI) agents, comprising:

a memory that stores instructions; and one or more processors configured by the instructions to perform operations comprising:

assigning, for each detected execution of a plurality of executions of the plurality of AI agents in a given networked system, a data unique tag to AI-generated data generated from execution of an AI agent, the data unique tag comprising a unique agent identifier associated with an AI agent that was executed, a time stamp associated with execution, and contextual metadata;

generating a lineage tag for new data created by each downstream application, the lineage tag based on each data unique tag associated with AI-generated data generated by one of more of the plurality of AI agents used to generate the new data;

generating a baseline, for each AI agent of the plurality of AI agents identified by a unique agent identifier, comprising one or more metric derived from AI-generated data generated from the execution of each AI agent;

evaluating continuously AI-generated data output from each AI agent as each AI agent is executed, to detect an output exceeding a threshold for a given metric;

detecting AI-generated data output exceeding a threshold for a given metric and using a lineage tag for the AI-generated data to trace actions that led to the AI-generated data output;

selecting a predefined action comprising at least one of quarantining the AI agent to prevent further execution or initiating a workflow to use the actions traced from the lineage tag; and executing a script associated with the predefined action.

20. A non-transitory computer-readable medium comprising instructions stored thereon that are executable by at least one processor to cause a computing device to perform operations for real-time monitoring of a plurality of artificial intelligence (AI) agents, comprising:

assigning, for each detected execution of a plurality of executions of the plurality of AI agents in a given networked system, a data unique tag to AI-generated data generated from execution of an AI agent, the data unique tag comprising a unique agent identifier associated with an AI agent that was executed, a time stamp associated with execution, and contextual metadata;

generating a lineage tag for new data created by each downstream application, the lineage tag based on each data unique tag associated with AI-generated data generated by one of more of the plurality of AI agents used to generate the new data;

generating a baseline, for each AI agent of the plurality of AI agents identified by a unique agent identifier, comprising one or more metric derived from AI-generated data generated from the execution of each AI agent;

evaluating continuously AI-generated data output from each AI agent as each AI agent is executed, to detect an output exceeding a threshold for a given metric;

detecting AI-generated data output exceeding a threshold for a given metric and using a lineage tag for the AI-generated data to trace actions that led to the AI-generated data output;

selecting a predefined action comprising at least one of quarantining the AI agent to prevent further execution or initiating a workflow to use the actions traced from the lineage tag; and executing a script associated with the predefined action.

* * * * *